April 29, 1969    J. S. BALLANTINE    3,440,916
TRACKER BAR AND MUSIC SHEET ROLL
Filed July 8, 1966

James S. Ballantine
INVENTOR

BY Adolph C. Hugin
ATTORNEY

United States Patent Office 3,440,916
Patented Apr. 29, 1969

3,440,916
TRACKER BAR AND MUSIC SHEET ROLL
James S. Ballantine, 135 Whitehorse Pike,
Absecon, N.J. 08201
Filed July 8, 1966, Ser. No. 563,828
Int. Cl. G10f 5/04
U.S. Cl. 84—146
28 Claims

ABSTRACT OF THE DISCLOSURE

A musical instrument mechanical playing control including a tracker bar and a perforated music sheet. The tracker bar has two rows of transversely staggered non-overlapping apertures connected in any conventional manner for playing notes and for general operation control. The note perforations are arranged into a plurality of transversely separated groupings of perforations corresponding to high-usage notes with at least one low-usage note set of perforations therebetween and a low-usage set of perforations along each edge of the sheet and tracker bar. The operation control apertures are included in the low-usage sets.

This invention relates to a musical instrument mechanical playing control, and particularly to improved features of such an instrument control utilizing an improved perforated music sheet and an improved cooperatively constructed tracker bar.

An object of the present invention is to provide an improved musical instrument mechanical playing control.

Another object of the present invention is to provide an improved tracker bar for a musical instrument.

A further object of the present invention is to provide an improved perforated music sheet for cooperation with a tracker bar of a musical instrument.

Yet another object of the present invention is to provide an improved music sheet roll and holder.

A still further object of the present invention is to provide an improved and miniaturized reinforced perforated music sheet.

Further objects and advantages of this invention will become apparent from the following description referring to the accompanying drawings, and the features of novelty which characterize this invention will be pointed out with particularity in the claims appended to and forming a part of this specification.

In accordance with the present invention, an improved musical instrument mechanical playing control is provided which is especially adapted for operating a musical instrument having at least one manual. This improved control provides for a miniaturization of a large part of the playing control system for the instrument, which results from a scientific analysis of musical compositions and the average use-frequency or usage of the various notes of the chromatic scale. This average usage of notes was determined by analyzing a very large number of musical compositions, ranging from the latest modern dance compositions and ballads through operatic and symphonic pieces. As a result of this analysis it was found possible to provide certain groupings of notes transversely of a perforated music sheet and separating these groupings by substantially unperforated or at least relatively low perforation usage bands which greatly reinforce the perforated paper and permit the use of perforations of greatly reduced size.

The tracker bar used in connection with the perforated music sheet also has been improved by the provision of apertures therein of relatively greatly reduced size made possible also by an improved arrangement of the notes operable by the tracker bar apertures. The tracker bar apertures are arranged in two rows, with the apertures in one row staggered transversely in nonoverlapping relation to and substantially midway of apertures in the adjacent row. Certain of these apertures are utilized for the playing of notes, and others for operation controls.

The music sheet is made with perforations transversely spaced for alignment with predetermined apertures of the tracker bar for sounding the notes of the instrument. The duration of a note for any specific music sheet is dependent upon the speed at which the sheet is passed over the tracker bar and the number of perforations which are successively aligned longitudinally of the sheet with only one interperforation web between successive perforations. This is a very important feature of the present invention in that it permits performer imperfections in timing of the different notes to be reproducible by the mechanical playing of the instrument, thereby completely eliminating the objectionable perfect playing of mechanical instruments by perforated music sheets, wherein the durations of the notes were exactly timed as a result of the exact proportional lengths of the perforations to the desired duration of each note. This note duration control is responsive to the overlapping effect on a tracker bar aperture of single interperforation web separated perforations.

Another of the important tracker bar features which contributes to the improved musical instrument operation control is the pattern of the notes which are operable by successive apertures in the two rows of the tracker bar. According to the present invention, this pattern is such that the apertures are successively arranged to sound half tones of the chromatic scale serially alternately in the two rows for any given manual. This is made possible by having a whole tone interval in pitch between adjacent note apertures in each row, and a half tone interval in pitch between note apertures in one row and adjacent note apertures in the adjacent row.

Another practical result of the miniaturization of the music sheet is that it can be mounted on a holder which is correspondingly short in length and relatively small in diameter, so that it can be stored with the longitudinal axis of the resultant music roll extending in a vertical direction. For some purposes, such as labeling the name of the composition on the cap of the holder, this feature might not be considered a great improvement. It should be noted, however, that almost all packages now are shelved by being placed on the ends of the containers, rather than on the sides, so that by force of habit a person inherently tends to store a package by placing it on its end. Since the music sheet lends itself readily to mounting on a spool, this conventional type of mounting is used with the present invention. Such spools normally have circular caps on the ends of the supporting spindle and, in the past, these have usually been stored in a square section container. The reason for this was in order to permit the shelving or storing of the containers on their sides. With the present small size of the music sheet, the resultant roll also is correspondingly small, and preferably is stored in a cylindrical container or can. This also has the advantage of reducing the cost of the music roll container.

In order to prevent rolling of the container and of the music roll or spool, when it is removed from the container, one of the caps on the end of the spool is made of a size such as that it will freely fit within the cylindrical casing or can, and the other cap is made of a size and shape so that it will fit snugly into the open end of the casing and form a closure therefor. This cap is provided with a flange extending radially outwardly therefrom, so as to cover the end of the casing and assure that the music roll has been fully inserted into the casing by engagement of this flange with the cylindrical open end thereof. Rolling of the music sheet roll and also of the casing with the roll therein is prevented by forming a series of nodules around the circumferential edge of the radially extending flange of the end cap of the spool and spacing these nodules circumferentially so as to form supports which serve as impediments against rolling.

Various details of the present invention will be more readily understood from the following description referring to the accompanying drawings in which.

Figure 1:
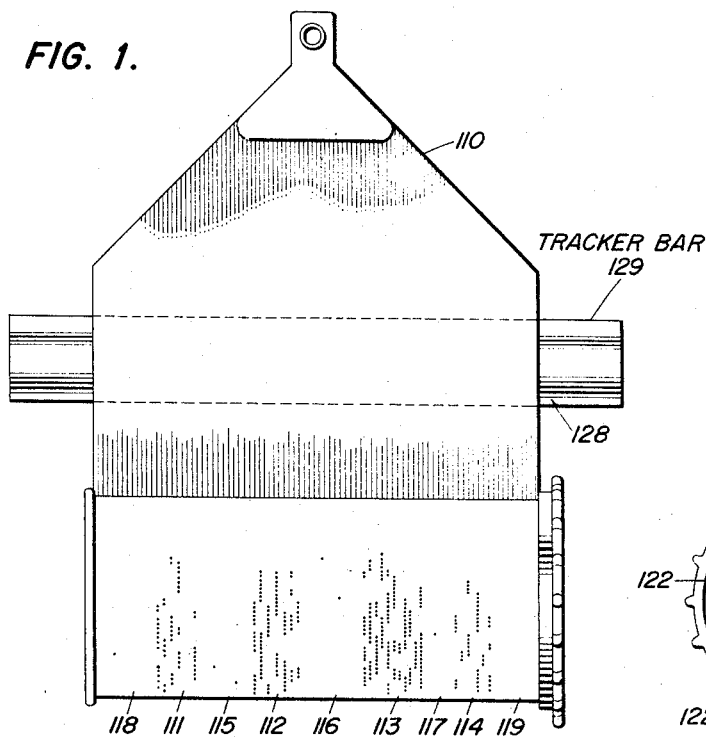
FIG. 1 is an elevational view illustrating the general relative arrangement of a perforated music sheet on a spool extending over a tracker bar.
Figure 2:
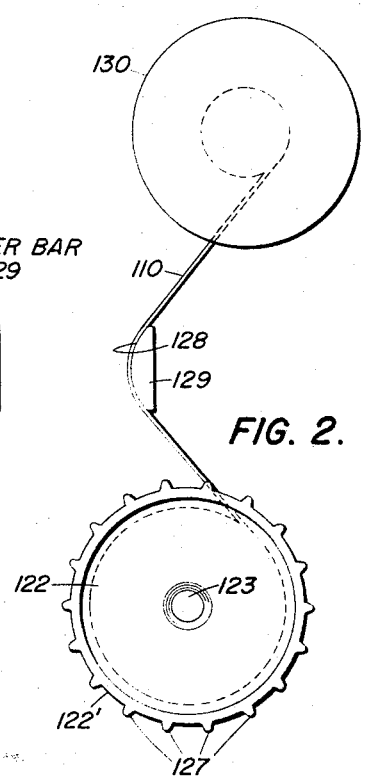
FIG. 2 is an end view of the spool and tracker bar shown in FIG. 1 and shows the manner in which a perforated music sheet extends over the apertured face of the tracker bar and is wound up on a take-up spool.
Figure 4:
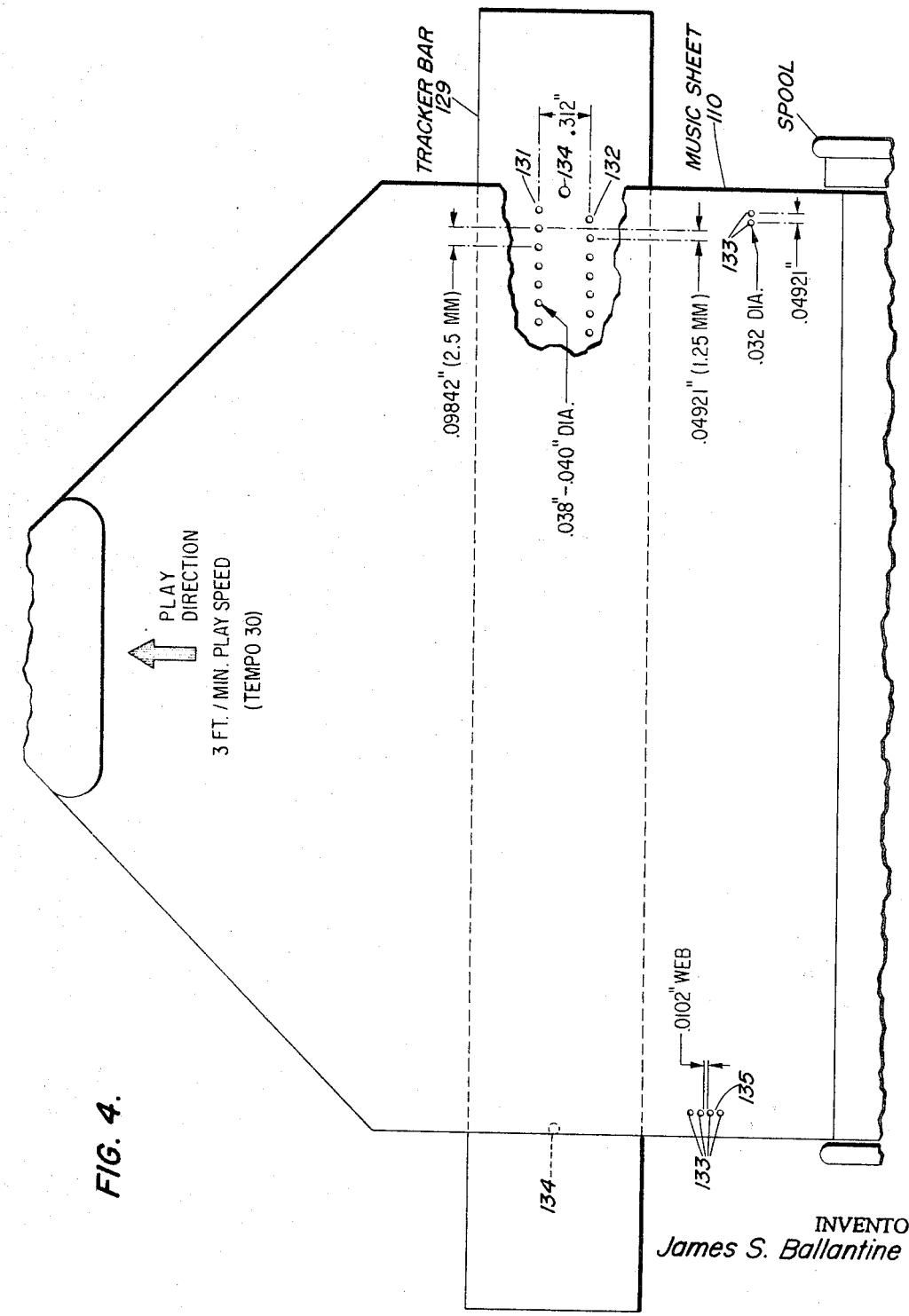
FIG. 4 is an enlarged view of the perforated music sheet spool and tracker bar shown in FIG. 1, with a part of the spool broken away and a part of the music sheet over the tracker bar also shown torn away so as to expose the apertures in the tracker bar to illustrate the relative arrangement and dimensions of the tracker bar apertures and music sheet perforations.
Figure 5:
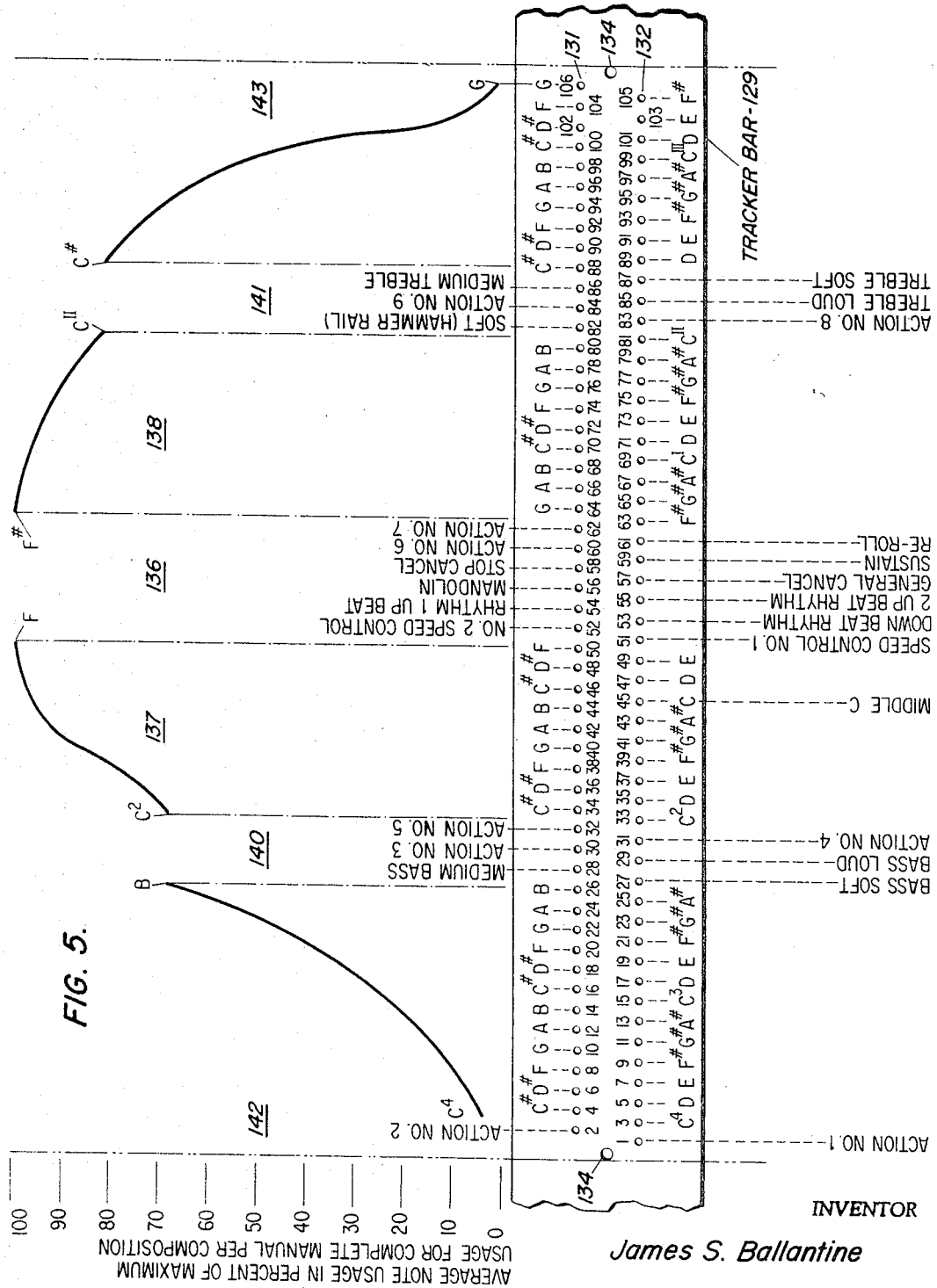
Figure 6:
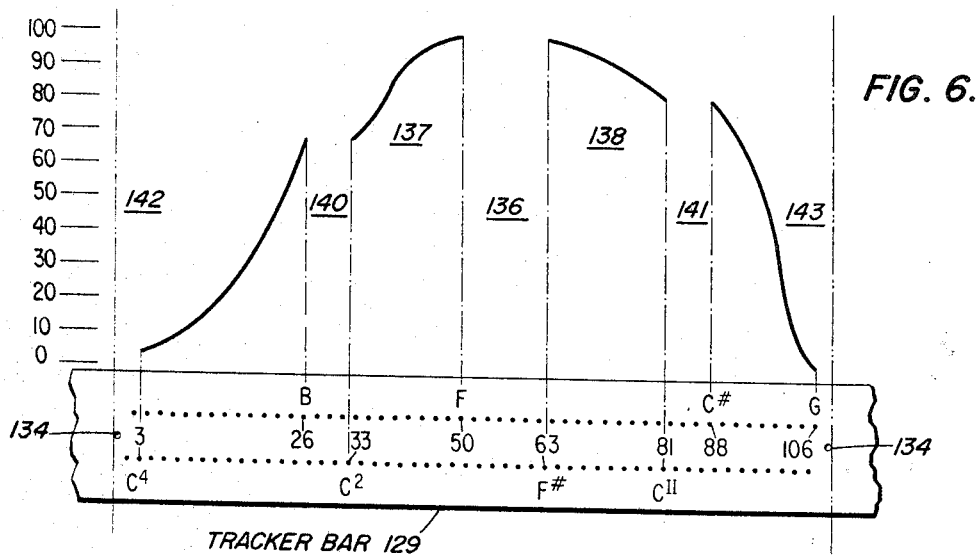
Figure 7:
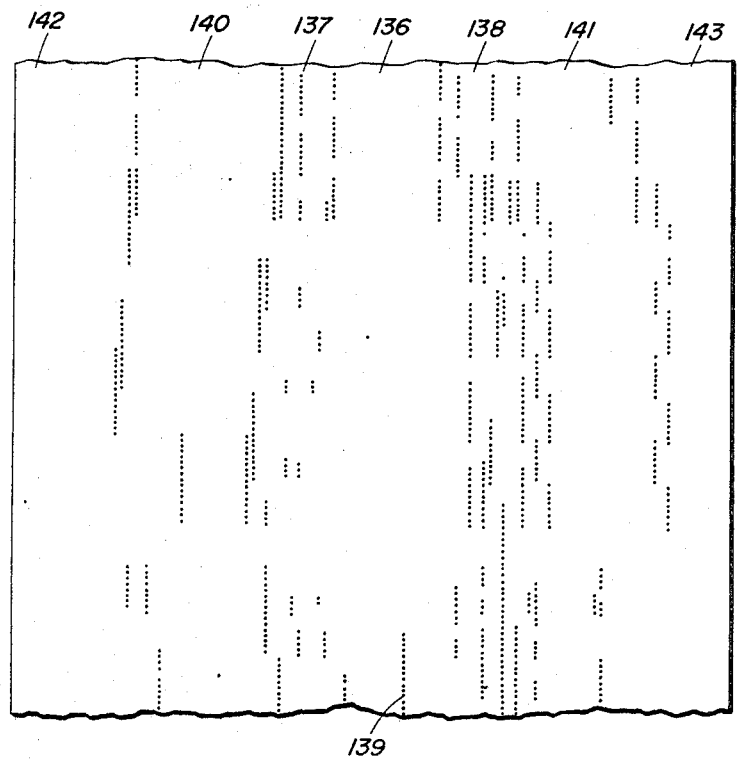
Figure 8:
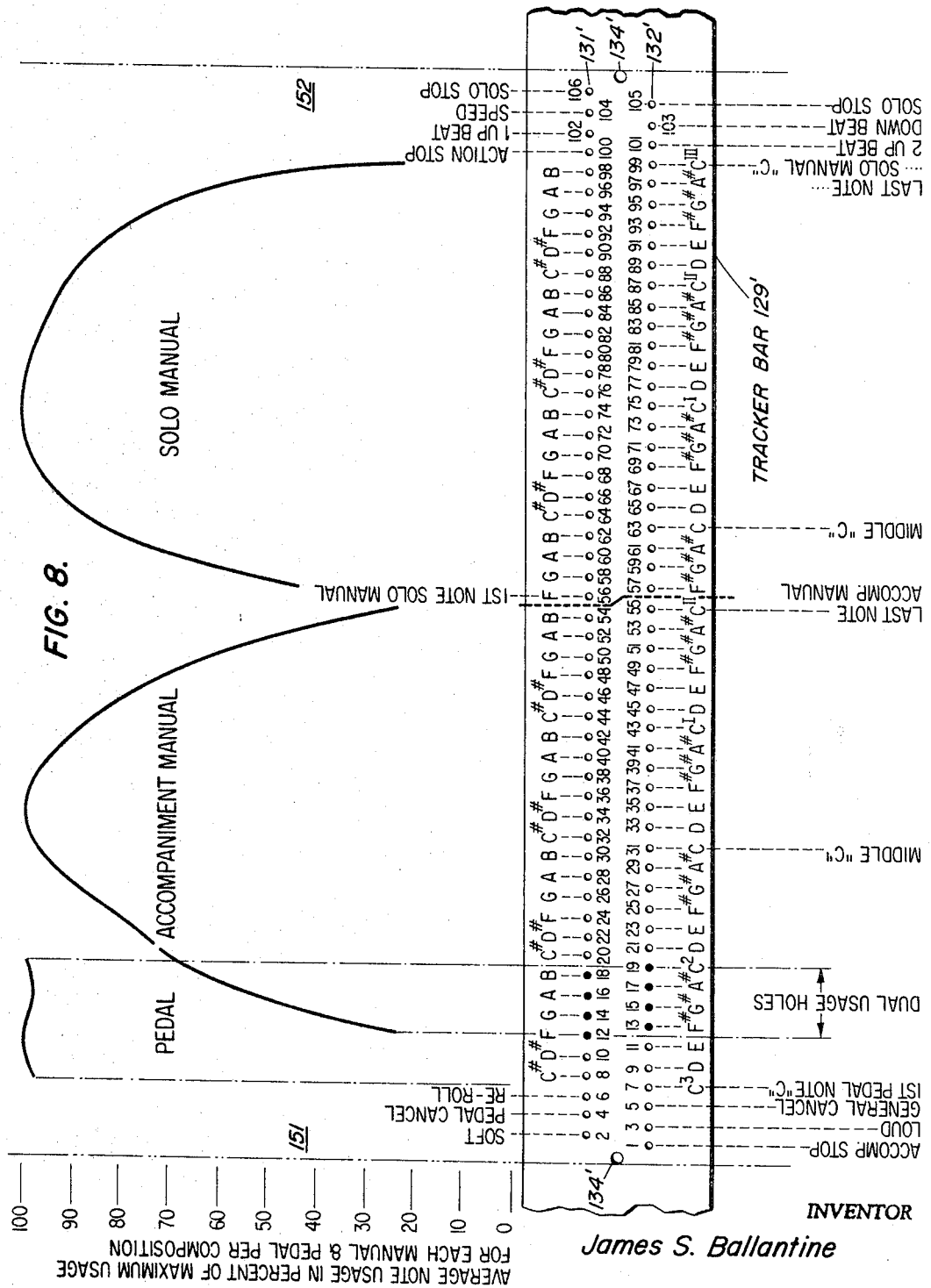
Figure 9:
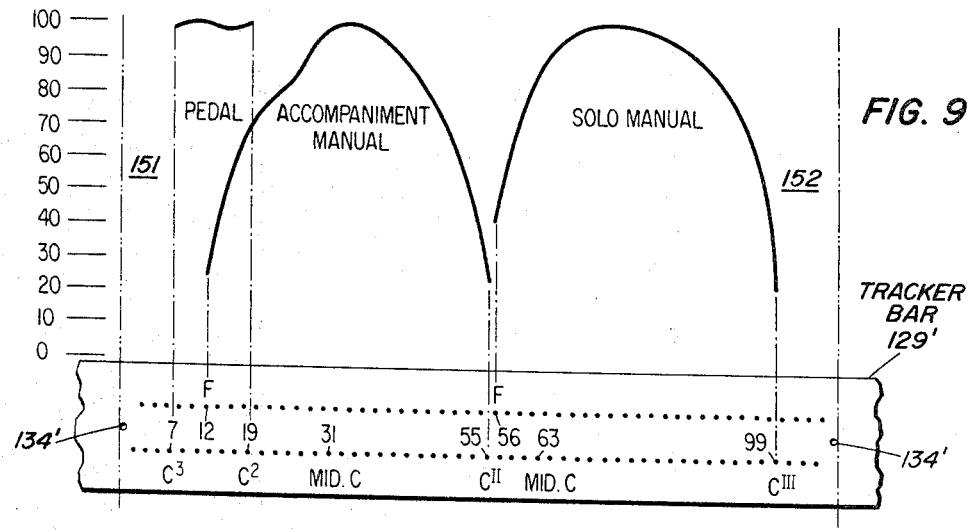
Figure 10:
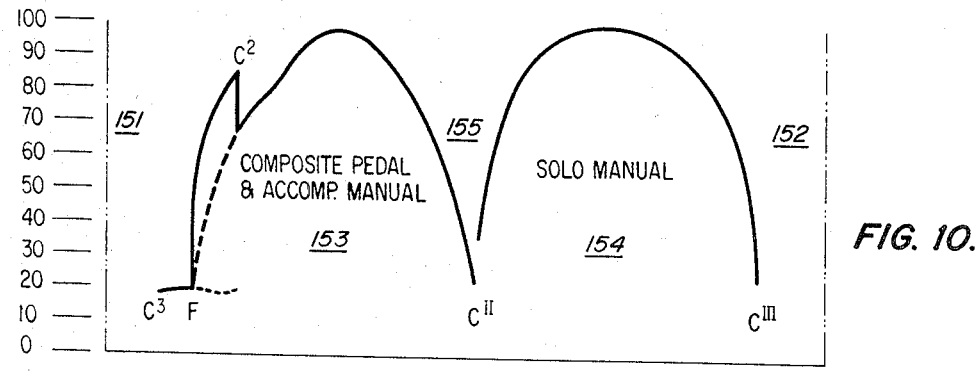
Figure 11:
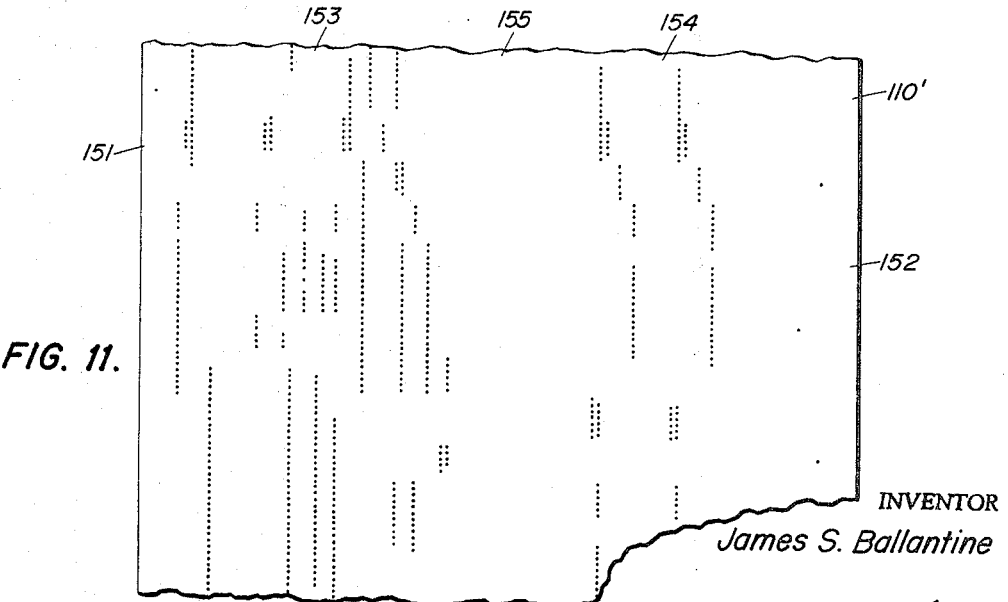

FIG. 5 is an enlarged view of the tracker bar shown in FIGS. 1, 2, and 4, with a graph containing curves illustrative of the average note usage in percent of maximum usage for a complete manual of an instrument having a single manual, such as a piano, and showing the relationship of this graphic analysis to the arrangement of the note apertures and the operation control apertures in the tracker bar;

FIG. 6 is a reproduction of the detailed illustration shown in FIG. 5 with the tracker bar shown substantially full size, so that it can be directly related to a full size illustration of a sample perforated music sheet for the type instrument to which the graph analysis of these two figures refers;

FIG. 7 is a full size illustration of a section of a perforated music sheet made in accordance with the graphic analysis illustrated in FIGS. 5 and 6, showing the reinforcing low usage bands of paper extending longitudinally of the music sheet between bands of high note usage which are grouped between the low usage bands;

FIG. 8 illustrates a graphic analysis similar to that of FIG. 5 for compositions adapted to be played upon a musical instrument having more than one manual, such as an organ, and the curves shown in this figure represent the separate average note usage in percent of maximum usage for the solo manual, the accompaniment manual, and the pedal, and illustrate how this graphic analysis of note usage is utilized in determining the arrangement of the note apertures and the operation control apertures in the tracker bar of the instrument;

FIG. 9 is similar to FIG. 8 and is reduced in size, so as to show the tracker bar substantially full size;

FIG. 10 represents the final complete analysis of the average note usage illustrated in FIGS. 8 and 9 for the particular organ for which this analysis was made, wherein eight of the tracker bar apertures are dual usage holes in that they are connected to the instrument for the control of a certain group of overlapping notes which can be played either by the accompaniment manual or the pedal separately, or in combination; and FIG. 11 illustrates a segment of a music sheet made in accordance with the analysis illustrated in FIGS. 8, 9, and 10, and clearly shows how the higher usage note groupings are separated into bands by relatively low perforation usage bands and protected on both sides thereof along both edges of the sheet by such low usage bands, thereby reinforcing the perforated music sheet and contributing materially to the longer useful life and the practical and efficient utilization of the miniaturized perforated music sheet.

Referring to the drawings, FIGS. 1, 2, 3, and 4 illustrate novel and improved features which are generic characteristics of the present improved tracker bar and perforated music sheet playing control system for a musical instrument. These improved features are based upon an extensive scientific analysis of musical compositions and of the materials of which the playing control system are manufactured. In the past, many attempts have been made to improve the quality of mechanically reproduced music. These attempts have included, inter alia, the utilization of a larger than conventional number of holes in a perforated music sheet used for controlling the playing of the musical instrument and also the provision of artificial imperfections in the duration of notes. These were efforts to produce musical reproductions which could be played over substantially the entire range of the chromatic scale available in the manuals of the musical instruments, and also to simulate the slight imperfections which a performer inherently produces in the duration of some notes, whereby the rendition of a musical composition by a performer incorporates the personal interpretations of the performer in his minute variations of the original compositions. These small variations introduced by a performer lend personality to the rendition of a musical composition which is not attainable in a mechanically reproduced piece wherein each note is perfectly accurately timed and has exactly the duration as required by the written composition. In addition, in the past, attempts have been made to provide relatively long playing perforated music sheets, but at best these have not met with general acceptance because of the relatively large size of the resultant music roll, making it awkward to handle, and very often requiring that the musical instrument be modified so that it could accept such an oversized roll. Efforts also have been made in the past to obtain longer playing music sheets as well as sheets which could control the playing of the entire manuals of the musical instruments.

After a very exhaustive study of a large variety of papers having numerous different finishes, compositions, and impregnations, it was found that substantially all papers absorb the same amount of moisture, or are dried out to the same extent under given atmospheric moisture conditions. The only difference is that certain papers will react more quickly to specific conditions than will certain other types of papers, so that the type of paper of which the perforated music sheet is made will not have any appreciable effect upon the expansion or contraction of the sheet because of the ambient humidity to which it is subjected. Thus the number and type of perforations in the paper will not materially effect changes therein due to atmospheric humidity. It was also determined that under normal conditions the large centers of population generally have a range of average atmospheric humidity which does not vary greatly. The average of this relatively narrow range of average humidity has been found to be close to 55% humidity. It also has been determined that the average temperature, in places where musical instruments, such as pianos and organs, are played, is generally maintained relatively close to 70° F.

According to the present invention, these determinations regarding the average humidity and temperature have advantageously been utilized by accurately maintaining the ambient humidity at 55% and the temperature at 70° F. during the punching of the perforations in the music sheet. Thus, the originally finished perforated music sheet is manufactured under the average atmospheric conditions under which it will be used in playing a musical instrument, with the result that the size and spacing of the perforations in the music sheet will be exactly the same as when the sheet was originally completed. These controlled atmospheric conditions during the manufacturing of the music sheets also make possible the production of music sheets having a relatively much smaller perforation size, and a greatly reduced spacing between adjacent perforations than has hitherto been practical, since they are manufactured under substantially their normal ambient use conditions. Furthermore, the tracker bar apertures are drilled and finished in the tracker bar also in an ambient of substantially 70° F. This assures a substantially perfect match of the tracker bar apertures in alignment with the music sheet perforations for the large majority of locations where these will be used in playing musical instruments.

In order to provide a relatively long-playing perforated music sheet, it was determined that the only practical arrangement for introducing the necessary larger number of note playing perforations would be to make these perforations much smaller than the conventional prior size with very small interperforation webs of paper between successive adjacent perforations. Also, the greatly reduced size of the perforations made possible the reduction of the transverse spacing between adjacent perforations in the music sheet, so that the overall width of the music sheet could be very materially reduced over the conventional sheet. One of the major problems encountered with this latter improvement was the fact that conventional longitudinal slits, proportional to the duration of the notes, as formerly generally used in such music sheets, produced a large number of very closely spaced slits in the paper and made such a music sheet extremely fragile and rather impractical. It was found that this problem could be overcome by providing a longitudinal series of successive single perforations spaced with only one interperforation web between successive perforations to provide a series of a length corresponding to the desired duration of the note. This had an additional very important practical beneficial result, in that the individual duration of each note could be varied directly in proportion to the duration given the note by a performer in rendering a musical composition. Thus, the individuality of each performer can be exactly reproduced in the music controlled by this type of perforated music sheet and each musical rendition can be as personalized as if it were actually being produced by the performer who plays the manual which punches the perforations in the music sheet. This is a very important aspect of the present invention which many prior attempts have failed to realize. In addition, this type of successive single perforation notes in place of longitudinal slits in the paper for determining the duration of the notes, provides a multitude of cross braces by means of the webs between each successive perforation, which greatly strengthen the music sheet and reduce the tendency of shredding.

In order to determine the feasibility of using miniaturized perforations and perforation spacing in paper music sheets, a scientific analysis of the average note usage for musical compositions of all sorts was investigated for the purpose of determining any characteristics common to all types of music which might be helpful toward this end. This was done by an actual count of the use of each note for a very large number of compositions of all types, including modern and classical dance music, marches, ballads, operatic and symphonic pieces. A very marked similarity was found to exist in all musical compositions in the average note usage in terms of the percent of maximum usage of a note for a complete manual for any given composition.

For single manual musical instruments, such as pianos, it has been found that this characteristic produces a curve indicative of a relatively high average note usage for the general range of the chromatic scale extending substantially from an octave below middle C to two octaves above middle C, with a relatively rapid progressive decrease in the average note usage beyond this range in both directions toward the respective adjacent ends of the scale. In a plural manual musical instrument, such as an organ where one manual, conventionally the upper manual is used to play the solo notes, and the second or lower manual is used to play the accompaniment notes, with a pedal for playing additional accompaniment notes usually of a relatively long duration, a similar marked uniform note usage characteristic was found to exist for all types of musical compositions. FIG. 8 illustrates these characteristics, and has been plotted as a graph for a spinet type organ. As shown in this figure, there is a relatively high average note usage for most of the central two-thirds of the solo manual, with a rapidly, progressively, decreasing note usage for the notes toward each respective end of the manual. The curve for the average note usage of the accompaniment manual indicates a relatively high average note usage for the central one-third of the manual with a progressive decrease in average note usage toward each respective end of the manual. In contrast to the two manuals, the average note usage of the pedal notes is substantially uniform. Each of these curves is based upon the maximum note usage of the individual group of notes considered, i.e., the maximum usage for the solo manual, the accompaniment manual, and the pedal, and this usage is expressed in terms of a percentage of the maximum note usage for each respectively. Thus the actual usage of the notes need not be the same and, in all probability, is not the same for the two manuals and for the pedal. This consideration will be explained more fully when details of the curves shown in FIG. 8 are explained later. This scientific analysis of the average note usage pattern for each manual of a musical instrument has been very advantageously utilized in the present invention to provide a highly improved and novel perforated music sheet, and its complementary tracker bar aperture arrangement, whereby a miniaturized improved playing control system is provided for a musical instrument.

In accordance with the present invention, the common pattern of average note usage as determined by the analyses previously mentioned has been utilized so as to produce a fairly uniform pattern of music sheet perforation. As shown in FIG. 1, the paper music sheet 110 is formed with a plurality of separate groups of high average usage perforations 111, 112, 113, and 114, which are separated by relatively low average perforation usage bands 115, 116, and 117, with a band 118 and 119 of low average perforation usage respectively along each edge of the sheet. This provides a reinforcing, almost unperforated, band of paper longitudinally along both sides of each high average usage group throughout the music sheet.

FIG. 1 illustrates the arrangement which has been developed specifically for a conventional single manual piano. As shown in this figure, the music sheet is wound in the conventional manner on a sheet music spoon which is shown in detail in FIG. 3. This spool forms part of the general improved holder and includes a spindle 120, preferably of metal, around which the sheet music 110 is wound between a pair of caps 121 and 122 mounted on opposite ends of the spindle 120. The cap 122 is formed with a conventional central pintle mounting bearing surface 123, and the cap 121 is formed with any suitable driving keyway or groove 124.

The assembled music sheet forms a roll which can conveniently be stored in a suitable cylindrical casing 125, with one end 126 closed and the opposite end thereof open and of a size to receive the assembled music sheet roll. The cap 121 of the mounting spool is made of a size so as to fit freely within the casing 125, and the other cap 122 is formed of a size and shape so as to cooperate with the open end of the casing to fit snugly therein in part, and has a flange 122' which extends radially outwardly therefrom so as to cover the end of the casing. This not only provides for the closure of the casing, so as to minimize possible damage to the music sheet during storage, but also serves to hold the assembled music sheet roll in position in the casing 125. Preferably, the casing for the music sheet roll is made of a length such that when the roll is assembled within the casing, the inner spool cap 121 is spaced a short distance inwardly from the casing end 126, so as not to rest thereon. If the roll is then stored in a vertical position with the casing resting on its closed end, the music sheet roll is suspended therein by the flange 122' on the closure cap 122 resting on the open end of the casing 125. If for any reason the weight of the music sheet on the spool cap 121 tends to cause this cap to deform, it will tend to make the outer edges of the cap move longitudinally away from the other cap 122. Similarly, if the weight of the music sheet tends to distort the end cap 122 during such storage, it will tend to draw the central portion of the cap 122 longitudinally downwardly towards the closed end 126 of the casing. Thus, if any distortion of the caps takes place, both caps will tend to be distorted in a similar manner concavely outwardly, so that there will be no net tendency for the caps to distort in the same direction, and therefore there will be not net tendency for the caps to hold the music sheet in either direction away from the center of the spool as it is being unrolled during the playing of an instrument.

Figure 3:
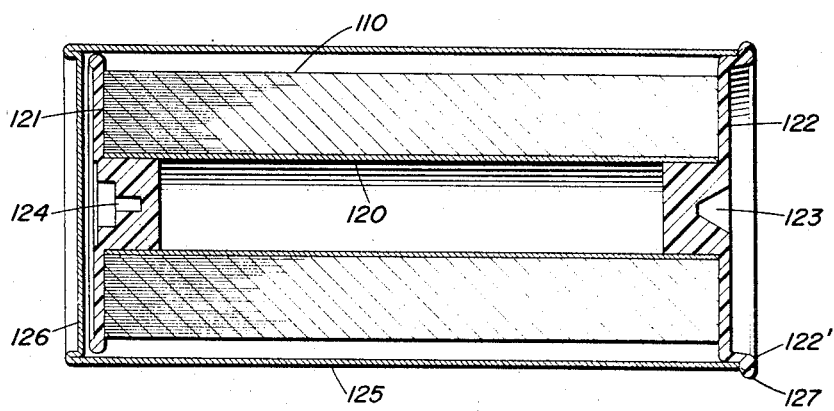
FIG. 3 is a sectional view through a music sheet wound up on a spool with the resultant roll inserted in a casing.

In order to minimize rolling of the sheet music roll if it be deposited with both end caps resting on a relatively flat surface, the larger cap 122 is provided with a series of nodules 127 around the outer edge of its flange 122', spaced so as to form supports for the holder. These nodules 27 extend radially outwardly so that a tangent between any two adjacent nodules will be spaced outwardly from the adjacent outer circular contour of the cap flange 122'. This assures that the cap will rest only on two nodules, so that these serve as impediments against rolling when the music sheet roll is placed on its side. As shown in FIG. 3, these nodules 127 also preferably extend outwardly a sufficient distance so as to project beyond the outer surface of the cylindrical casing 125, so as also to assure that the cylindrical casing will not rest upon a surface when an assembled roll and casing are laid on a flat surface, so that it will also be prevented from rolling by these spaced nodules.

In accordance with the improved perforated music sheet playing control system, the music sheet is adapted to pass from the roll on the spindle 120 over an apertured smooth surface 128 of a tracker bar 129, and to be rewound in any suitable manner upon a take-up spool 130. In order to utilize the tracker bar more efficiently in accordance with the miniaturized aspects of the present invention, it is provided with two rows of apertures 131 and 132 for cooperation with perforations in the music sheet 110 for playing the instrument. As is shown in greater detail in FIG. 4, the apertures in one row are staggered transversely in nonoverlapping relation and substantially midway of the apertures in the adjacent row. Certain of these apertures are connected to control the operation of notes on the instrument, and others are for specialized operation controls. Details of such controls do not form part of the present invention, and therefore are not illustrated or described in connection with the embodiments herein disclosed. The perforated music sheet 110 is formed with perforations 133 all of a substantially uniform size and transversely spaced for alignment with predetermined apertures in the tracker bar for sounding the notes of the instrument and for operational controls.

It has been found that with the miniaturized construction of the present invention, a spacing between the tracker bar rows of apertures 131 and 132 of three hundred and twelve thousandths of an inch (.312) between transverse center lines thereof and a transverse spacing of 2.5 millimeters (.09842 inch) between centers of adjacent apertures in each row and 1.25 millimeters (.04921 inch) transversely between centers of adjacent apertures in the two rows provides sufficient space for the accommodation of connections to the spacer bar from the instrument playing controls and yet maintains the general reduction in size inherent in all aspects of the present invention. The music sheet perforations 133 are made circular with a diameter of thirty-two thousandths of an inch (.032), and adjacent perforations are transversely spaced 1.25 millimeters between centers, the same as the spacing between adjacent apertures 131 and 132 in the two tracker bar rows. This provides a transverse spacing of transversely aligned adjacent apertures with a single web between them, and, therefore, of transversely adjacent longitudinal rows of perforations similarly spaced by a single web of .0492″−.032″=.0172″; that is, of substantially one hundred seventy-two ten thousandths of an inch, as shown in FIG. 4. In order to allow for slight misalignments between the music sheet perforations and the tracker bar apertures, the tracker bar apertures are formed with a diameter between thirty-eight thousandths (.038) and forty thousands of an inch (.040). In order further to assure against misalignment between music sheet perforations and tracker bar apertures, a tracking hole 134 is formed in the tracker bar at each end of the two rows of apertures, such that a music sheet 110 which is properly centered will cover both of the holes 134, with the outer edges of the music sheet tangent to the outside of both holes. If the sheet 110 shifts relative to the tracker bar, it uncovers one of the tracking holes 134. This will cause the tracker bar to be shifted correspondingly so as to again close off the exposed tracking hole. Details of the mechanism for providing this adjustment of the tracker bar are not part of the present invention and, therefore, are not disclosed herein.

With the miniaturized perforations of the music sheet combined with the miniaturized transverse spacing between adjacent perforations, it becomes highly important to the life of the music sheet to provide reinforcement so as to minimize shredding and tearing of the sheet, as well as fraying of its edges. This is obtained by a combination of two very important features. One of these is the elimination of conventional longitudinal slits in the music sheet corresponding to the duration of a note. In place of such slits a series of successively longitudinally aligned perforations are formed in the sheet with a web 135 which has a predetermined maximum length between longitudinally serially successive perforations 133. The web must, therefore, be of such a size as to produce the same resultant effect on the cooperating tracker bar aperture as if it were not present, i.e., the longitudinally successive perforations with a predetermined maximum web between adjacent perforations must have the same effect on a tracker bar aperture as if only a slit were present in the music sheet, and the number of such successive perforations must be such as to have the same effect as a slit having a length corresponding to the length including both of the end perforations required to produce the desired duration of a note. It has been found that with perforations of the shape and size previously mentioned, that a web of substantially one-hundred and two ten thousandths of an inch (.0102) at its narrowest width, FIG. 4, will provide the desired overlapping effect on the tracker bar apertures. This has two very practical results; it strengthens the music sheet by eliminating slits, and it provides for the duration of a note for a specific music sheet speed which is dependent upon the number of successive longitudinal perforations, whereby slight performer imperfections in the timing or duration of a note are exactly reproducible.

In order to provide for the playing of successive half tone notes of the chromatic scale, it has been found desirable to arrange these half tone notes serially alternately in the two rows of tracker bar apertures. This can conveniently be provided for any particular manual by a note aperture arrangement of a whole tone in pitch between adjacent note apertures in each row, with a half tone in pitch between note apertures in one row and adjacent note apertures in the adjacent row. Such an arrangement enables the utilization of the most efficient grouping of notes of high average usage between bands of perforations of relatively very low average usage, so as to provide the desired reinforcement of the perforated music sheet. FIG. 5 illustrates this type of grouping of high average note usage between bands of substantially imperforate or relatively low average perforation usage for a single manual musical instrument, such as a piano.

The notes sounded by the apertures in the tracker bar are shown adjacent each respective aperture.

In this arrangement the average note usage in percentage of maximum usage for the complete manual per composition produces a chart which indicates a relatively highly note usage from about one octave below middle C to about two octaves above middle C. This is indicated by the two central portions of the curve marked by the terminal notes $C^2$–F and F♯–$C^{II}$. The average note usage on either side of these two sections of the manual decrease relatively very rapidly toward each outer end of the manual. This is indicated by the two outer portions, also marked by the respective terminal notes B–$C^4$ and C♯–G of the curve in FIG. 5. The four portions of the curve $C^4$–B, $C^2$–F, F♯–$C^{II}$, and C♯–G are separated in this figure in order to correlate these portions of the curve to the physical note arrangement adapted to be played by tracker bar apertures shown on the tracker bar 129. The tracker bar is formed with one-hundred and six apertures in the two rows of apertures 131 and 132.

In order to obtain the desired strengthening bands in the perforated music sheet the notes having a relatively higher usage, as indicated by the sections of the curve $C^2$–F and F♯–$C^{II}$ are separated from each other and from adjacent portions of the curve, representing the remaining note apertures, by tracker bar apertures which are connected to operation controls of the musical instrument. Specifically, the apertures corresponding to the notes F and F♯ are separated by apertures 51–62, all of which are connected to certain operation controls and provide a relatively wide band 136 in the center of the music sheet between the maximum average usage notes which has relatively very few perforations therein.

Reference is here made to FIGS. 6 and 7 which correlate the details of FIG. 5 to an actual full size reproduction of a section of a perforated music sheet made in accordance with the present invention. As shown in these two figures, the central reinforcing band 136 of low perforation usage is clearly visible between the two adjacent bands 137 and 138 of relatively high usage. In most instances, operation controls will be responsive to a single perforation; however, in some cases, such as when a general cancel operation control is used, a series of successive longitudinally aligned perforations 139 are, used, so as to assure a complete response of all of the operation controls. This, of course, normally occurs very infrequently. The two end portions of the curve $C^4$–B and C♯–G, representing the notes operable by tracker bar apertures 3–26 and 88–106, respectively, are spaced from adjacent central portions of the curve by respective low usage bands 140 and 141, each of which includes six perforations connected to operation controls of the musical instrument. This provides two additional strengthening substantially imperforate or low usage bands in the music sheet, and, in the illustrated embodiment, the band 140 between the notes B and $C^2$ includes the perforations 27–32, and the band 141 between the note perforations $C^{II}$ and C♯ includes the six tracker bar perforations 82–87.

Two additional operation control apertures 1 and 2 are formed at the extreme left end as shown in this figure. This provides an additional strengthening low usage band 142 along this edge of the music sheet. The righthand edge of the music sheet also is formed with a low usage band 143, since the notes operable by apertures 104, 105, and 106 are used very infrequently, as indicated by the curves in FIGS. 5 and 6. This is clearly borne out by the full size sample of the perforated music sheet shown in FIG. 7, wherein the bands at the edges of the sheet are substantially imperforate. Thus, it is seen that a perforated music sheet formed in accordance with the present invention provides individually miniaturized perforations connected by individually miniaturized webs between adjacent perforations, which make possible the use of a greatly reduced transverse width of the music sheet and, for a given composition, produces a correspondingly greatly reduced length of music sheet. Advantage has been taken of this large reduction in music sheet size to produce a music sheet which is capable of greatly prolonged playing as compared to conventional music sheets, and it has been found practical to make this type of miniaturized music sheet of such a length as to control the playing of a musical instrument for thirty minutes or longer, as compared to an average five minute playing for a convention roll.

The present invention is equally advantageously applicable to musical instruments provided with a plurality of manuals, in that it can be utilized to separate high usage perforations into bands between which very low usage perforation bands are formed and along the edges of which other low perforation usage bands also are provided, whereby the resultant music sheet is greatly strengthened. This was determined by a scientific analysis of the average note usage of percentage of maximum usage for each manual per composition, and, as in the previously mentioned analysis, included substantially all types of music, ranging from modern and classical dance compositions to marches and operatic and symphonic pieces. As in the prior analysis, the note usage for each note of each manual was counted, and the average usage was determined in relation to each individual manual. Since plural-manual musical instruments, such as organs, usually also have a third set of notes operable by a pedal, this part of the musical compositions also was similarly analyzed. FIG. 8 shows the analysis for a two-manual spinet organ having a pedal, the eight highest notes of which are the same as the eight lowest notes of the accompainment or lower manual of the instrument. Thus the tracker bar apertures 12–19 are dual usage holes which serve to control the operation of notes both in the accompaniment manual and the pedal. These notes are respectively the same pitch in the pedal and the accompaniment manual, although these may be of a different timbre and are operable simultaneously in both, or singly in one or the other in response to a proper operation control.

As in most conventional organs, the upper manual is the solo manual, and the analysis indicates a very high usage of most of the central two-thirds of the solo manual, with a rapidly decreasing note usage for the notes toward each respective end of this manual. The notes of this solo manual are shown adapted to be operated by the tracker bar apertures 56–99 of the tracker bar 129′. The notes of the accompaniment manual are shown adapted to be operated by the tracker bar apertures 12–55; and, as shown, the cure for the average note usage for this manual indicates a relatively high average note usage for the central one-third of the manual, with a progressive decrease in the average note usage toward each respective end of this manual. Thus, it is seen that there is a group of notes near the center of the tracker bar 129′ which has a relatively very low average usage, so that the relatively higher average note usage portions of the two manuals are separated by a group of notes of very low usage. The pedal notes are adapted to be operated by the tracker bar apertures 7–19 and the average note usage as indicated by the pedal curve shows that these notes are used substantially uniformly. As previously stated, each curve is drawn for its individual maximum usage and is not necessarily directly proportional to any of the other curves in FIG. 8.

In order to provide the desired strengthening of a miniaturized music sheet of this type, the operation control apertures are divided and are arranged along both ends of the two rows 131′ and 132′ of the tracker bar apertures. In the illustrated embodiment, the lefthand group of operation controls are connected to tracker bar apertures 1 and 6, and the righthand operation controls are connected to the tracker bar apertures 100–106. These provide very low usage bands 151 and 152 along the edges of the music sheet. This is clearly illustrated by reference to FIG. 11 which shows a full size section of an actual perforated music sheet. As there shown, the low usage bands 151 and 152 provide edges which protect the playing portion of the perforations in the sheet against accidental damage by fraying or tearing of the edges. In addition to this protection, it is desirable, in accordance with the present invention, to arrange the operation controls with the more important controls toward the centers of the sheet and the lesser important operation controls progressively nearer the edges of the sheet. In this manner, damage to the edges of a music sheet will tend to affect only the lesser important operation controls. This is applicable to all embodiments of the present invention.

FIGS. 9, 10, and 11 illustrate more concretely the manner in which the detailed analysis of FIG. 8 is utilized in the final embodiment of this aspect of the invention. FIG. 9 is a reproduction of the detailed note analysis chart shown in FIG. 8, wherein the tracker bar and its perforations are shown full size, so as to correlate it directly to a full size section of a perforated music sheet shown in FIG. 11. As shown in FIG. 9, the notes of each manual extend serially progressively alternately between the two rows of apertures 131′ and 132′ transversely across the tracker bar 129′. This series progression is independently serially provided for each of the manuals by an arrangement of the connections of the notes operable by the tracker bar apertures so that the notes of the apertures in each row are one whole tone interval in pitch between adjacent note apertures, and the staggered arrangement of the apertures in the two rows produces a half tone interval in pitch between note apertures in one row and adjacent note apertures in the adjacent row, so that the apertures are adapted to sound half tones of the chromatic scale serially alternately by the apertures of the two rows. This is true for both the solo manual and the accompaniment manual considered independently of each other. Since there is an overlapping of the pedal and the accompaniment manual in the dual usage holes, an accurate correlation of the indivdual curves has been shown in FIG. 10 by reducing the average maximum usage of the pedal to the same coordinates as those for the accompaniment manual. The dual usage of the apertures 12–19 results in a composite curve for the pedal and the accompaniment manual indicated by the solid lines C³–F–C²–C^II. This final set of curves shown in FIG. 10 represents the average note usage curves which combine to produce the desired miniaturized perforated music sheet having high usage bands 153 and 154, separated by at least one low usage band 155, with a respective low usage band 151 and 152 along each edge of music sheet 110′.

As in the prior construction, the tracker bar 129′ is provided with tracking apertures 134′ for centering the music sheet on the tracker bar and maintaining the alignment of the respective music sheet perforations with the corresponding tracker bar apertures. The operation of these tracking aperatures is the same as has been previously described with reference to the first disclosed embodiment of this invention.

The miniaturized perforations with miniaturized webs between adjacent perforations cooperate with the bands of relatively high usage, protected on each side thereof by strengthening bands of low perforation usage to provide perforated music sheets of a relatively greatly reduced width, and correspondingly greatly reduced length for any given composition. As in the previous disclosure, the reduction in length by this miniaturization can be utilized to provide a long playing music sheet as has been previously explained.

While particular embodiments of this invention have been illustrated and described, modifications thereof will occur to those skilled in the art. It is to be understood, therefore, that this invention is not to be limited to the exact details disclosed.

The invention claimed is:

1. A tracker bar and a perforated music sheet playing control system for a musical instrument having a manual, said tracker bar comprising two rows of apertures for cooperation with a perforated music sheet for playing the instrument, said apertures in one row being staggered transversely in nonoverlapping relation to and substantially midway of apertures in the adjacent row, certain of said apertures being for notes and others for operation controls, and said sheet perforations being located transversely of the sheet in a predetermined arrangement wherein perforations for notes having a high average usage are generally grouped substantially together and are separated by at least one band of low average perforation usage with a band of low average perforation usage along each edge of the sheet and said tracker bar apertures being correspondingly arranged.

2. A tracker bar and perforated music sheet playing control system for a musical instrument having a manual, said tracker bar comprising two rows of apertures for cooperation with a perforated music sheet for playing the instrument, said apertures in one row being staggered transversely in nonoverlapping relation to and substantially midway of apertures in the adjacent row, certain of said apertures being for notes and others for operation controls, said perforated music sheet having perforations all of a substantially uniform size and transversely spaced for alignment with predetermined apertures in said tracker bar for sounding the notes of the instrument, the duration of a note for a specific sheet being dependent upon the speed at which it passes over the tracker bar and the number of perforations serially successively aligned longitudinally of the sheet with a predetermined maximum length web between successive perforations whereby slight imperfections in timing are reproducible, said duration being responsive to the overlapping effect on a tracker bar aperture of said successive predetermined maximum length web separated perforations wherein each perforation is substantially circular with about thirty-two thousandths (.032) of an inch diameter and each predetermined maximum length web is substantially one hundred and two ten thousandths (.0102) of an inch at its narrowest width.

3. A musical instrument playing control system as defined in claim 2 wherein said rows of tracker bar apertures are spaced three hundred and twelve thousandths of an inch (.312) between transverse center lines thereof, and said music sheet perforations for both rows are spaced longitudinally of the sheet to correspond to the apertures in the respectively spaced rows to provide the desired playing timed relation of the respective notes and controls.

4. A musical instrument playing control system as defined in claim 2 wherein said tracker bar apertures are arranged for playing notes a half tone apart on the chromatic scale serially alternately in said two rows by a note aperture arrangement for the manual a whole tone in pitch between adjacent note apertures in each row and a half tone in pitch between note apertures in one row and adjacent note apertures in the adjacent row.

5. A music sheet having perforations of a size and arrangement providing for cooperation with apertures in a tracker bar for playing of a musical instrument, certain of said perforations being for notes and others for operation controls, said sheet perforations being located transversely of the sheet in a predetermined arrangement wherein perforations for notes having a high average usage are generally grouped substantially together and are separated by at least one band of low average perforation usage with a band of low average perforation usage along each edge of the sheet.

6. A music sheet of the type defined in claim 5 wherein part of the operation control perforations are arranged as a group along each outer edge of the note perforations thereby further providing a low usage reinforcing band along each edge of the sheet.

7. A music sheet of the type defined in claim 5 wherein the band of low average perforation usage separating the high average usage perforations comprises part of said operation control perforations.

8. A music sheet of the type defined in claim 5 wherein said note perforations are arranged transversely of the sheet for cooperation with tracker bar apertures serially according to the chromatic scale and are separated into a plurality of groups by bands of low average perforation usage.

9. A music sheet of the type defined in claim 8 wherein said plurality of groups of note perforations include at least four groups, and said bands of low average perforation usage comprise said operation control perforations.

10. A music sheet of the type defined in claim 5 wherein each of said groups of note perforations of high average usage are arranged serially independently according to the chromatic scale within each group.

11. A music sheet of the type defined in claim 10 wherein said bands of low average usage perforations along each edge comprise said operation control perforations.

12. A music sheet of the type defined in claim 10 wherein said band of low average usage perforations separating said high average usage groups comprise note perforations at adjacent ends of said groups comprising relatively low average usage note perforations.

13. A music sheet having perforations of a size and arrangement providing for cooperation with apertures in a tracker bar for operation of a musical instrument having two manuals, said perforations for notes of each manual being grouped together transversely successively of the sheet and serially according to the chromatic scale within each group whereby notes of each manual occur as perforations only in a predetermined lateral portion of the sheet thereby providing a note perforation arrangement wherein low usage notes are grouped in bands along each edge and along the center of the sheet and thereby separate the higher usage notes into a separate band for each manual.

14. A music sheet having perforations all of substantially uniform size and wherein longitudinally serially successive perforations have a predetermined maximum length web therebetween of substantially one hundred and two ten thousandths (.0102) of an inch at its narrowest length, the duration of each note being dependent upon the number of perforations longitudinally serially successively aligned with only said predetermined maximum length web between successive perforations, said perforations having predetermined transverse arrangement for cooperation with correspondingly arranged apertures in a tracker bar wherein perforations having a high average usage are generally grouped substantially together into a plurality of such transverse groupings with a band of low average usage perforations intermediate said high usage groupings.

15. A perforated music sheet as defined in claim 14 wherein transversely adjacent longitudinal rows of perforations are transversely spaced substantially one hundred seventy-two ten thousandths of an inch (.0172).

16. A perforated music sheet as defined in claim 14 wherein each perforation is substantially circular with about thirty-two thousandths (.032) of an inch diameter.

17. A perforated music sheet as defined in claim 16 wherein transversely adjacent longitudinal rows of perforations are transversely spaced substantially one and one-fourth millimeters (1.25 mm.) between center lines.

18. A tracker bar for a musical instrument having a manual, said tracker bar comprising two rows of apertures for cooperation with a perforated music sheet for playing the instrument, said apertures in one row being staggered transversely in nonoverlapping relation to and substantially midway of apertures in the adjacent row, certain of said apertures being for notes and others for operation controls, said note apertures for a manual being arranged according to a pattern wherein the apertures are adapted to sound half tones of the chromatic scale serially alternately in said two rows by a note aperture arrangement having a whole tone interval in pitch between adjacent note apertures in each row and a half tone interval in pitch between note apertures in one row and adjacent note apertures in the adjacent row.

19. A tracker bar as defined in claim 18 wherein said operation control apertures comprise at least three groups, each of said groups being arranged transversely between groups of said note apertures whereby said note aperture groups are separated by apertures of relatively low average usage.

20. A tracker bar as defined in claim 18 wherein said rows of apertures are spaced three hundred and twelve thousandths of an inch (.312) between transverse center lines thereof.

21. A tracker bar as defined in claim 18 wherein said note apertures comprise groups of apertures for a solo manual and for an accompaniment manual and for a pedal, each group of apertures extending serially according to said manual tone pattern, said two manual groups being arranged transversely successively whereby notes of each manual occur for apertures only in a predetermined lateral portion of said tracker bar and with low usage notes grouped together adjacent to each edge of the tracker bar and along substantially the central portion thereof, and having a portion of said note apertures serving both as part of the higher pedal notes and part of the lower notes of the accompaniment manual notes where each aperture serves for the same note in both.

22. A tracker bar as defined in claim 18 wherein said apertures are substantially circular on a diameter of thirty-eight to forty thousandths of an inch (.038–.040.).

23. A tracker bar as defined in claim 22 wherein said apertures in each row are spaced transversely two and one-half millimeters (2.5 mm.) between centers and one and one quarter millimeters (1.25 mm.) between centers in adjacent rows.

24. A music sheet having perforations of a size and arrangement providing for cooperation with apertures in a tracker bar for playing of a musical instrument, certain of said perforations being for notes and others for operation controls, said sheet perforations being located transversely of the sheet in a predetermined arrangement wherein perforations having a high average usage are grouped substantially together in a plurality of groups and are separated by at least one substantially unperforated band with a substantially unperforated band along each edge of the sheet.

25. A music sheet having perforations of a size and arrangement providing for cooperation with apertures in a tracker bar for playing a musical instrument, certain of said perforations being for notes and others for operation controls, said sheet perforations being located transversely of the sheet in a predetermined arrangement wherein perforations for notes having a high average usage are generally grouped substantially together and are separated by at least one band of low average perforation usage with a band of low perforation usage along each edge of the sheet, said perforations all being of a substantially uniform size, the duration of each note for a specific sheet being made dependent upon the number of perforations serially successively aligned longitudinally of the sheet with a predetermined maximum length web between successive perforations whereby slight performer imperfections in timing are reproducible, said duration being responsive to the overlapping effect on a tracker bar aperture of serially successive predetermined maximum length web separated perforations wherein each predetermined maximum length web is substantially one hundred and two ten thousandths of an inch (.0102") at its narrowest width.

26. A perforated music sheet as defined in claim 25 wherein transversely adjacent longitudinal rows of perforations are transversely spaced substantially one hundred seventy-two ten thousandths (.0172") of an inch.

27. A perforated music sheet as defined in claim 25 wherein each perforation is substantially circular with about thirty-two thousandths (.032") of an inch diameter.

28. A perforated music sheet as defined in claim 25 wherein transversely adjacent longitudinal rows of perforations are transversely spaced substantially one and one-fourth millimeters (1.25 mm.) between center lines.

References Cited

UNITED STATES PATENTS

| 1,159,670 | 11/1915 | Heyl | 84—161 |
| 1,201,371 | 10/1916 | Smith | 84—152 |
| 1,111,328 | 9/1914 | Smith | 84—148 |
| 1,090,344 | 3/1914 | Propson | 84—161 |

RICHARD B. WILKINSON, *Primary Examiner.*

J. F. GONZALES, *Assistant Examiner.*

U.S. Cl. X.R.

84—161